(12) United States Patent
Tompkins et al.

(10) Patent No.: US 8,049,637 B2
(45) Date of Patent: Nov. 1, 2011

(54) SYSTEMS AND METHODS FOR SENSOR-LEVEL MACHINE MONITORING

(75) Inventors: Marc Steven Tompkins, Minden, NV (US); Richard Herman Hall, Minden, NV (US)

(73) Assignee: General Electric Company, Schenectady, NY (US)

( * ) Notice: Subject to any disclaimer, the term of this patent is extended or adjusted under 35 U.S.C. 154(b) by 406 days.

(21) Appl. No.: 12/247,002

(22) Filed: Oct. 7, 2008

(65) Prior Publication Data

US 2010/0085205 A1   Apr. 8, 2010

(51) Int. Cl.
*G08B 21/00* (2006.01)
*B25B 23/145* (2006.01)

(52) U.S. Cl. .......... 340/683; 340/680; 340/682; 173/20

(58) Field of Classification Search .......... 340/679, 340/682, 683, 686.2–686.5, 286.02, 572.1–572.9; 173/20; 73/570, 584, 593, 649, 658–660
See application file for complete search history.

(56) References Cited

U.S. PATENT DOCUMENTS

| | | | |
|---|---|---|---|
| 5,528,219 A * | 6/1996 | Frohlich et al. | 340/540 |
| 7,019,661 B2 * | 3/2006 | Misato | 340/682 |
| 7,496,477 B2 * | 2/2009 | Misra et al. | 702/187 |
| 7,668,670 B2 * | 2/2010 | Lander | 702/51 |
| 7,688,218 B2 * | 3/2010 | LeFebvre et al. | 340/682 |
| 7,719,416 B2 * | 5/2010 | Arms et al. | 340/539.1 |
| 2002/0171555 A1 * | 11/2002 | Kochersberger et al. | 340/683 |
| 2006/0145881 A1 * | 7/2006 | Sakatani et al. | 340/679 |
| 2007/0063859 A1 * | 3/2007 | Twerdochlib et al. | 340/679 |
| 2007/0111790 A1 * | 5/2007 | Maekawa et al. | 463/40 |
| 2008/0001772 A1 * | 1/2008 | Saito | 340/679 |
| 2008/0074254 A1 * | 3/2008 | Townsend et al. | 340/539.11 |
| 2008/0097725 A1 | 4/2008 | Knodle et al. | |

* cited by examiner

*Primary Examiner* — Jennifer Mehmood
(74) *Attorney, Agent, or Firm* — Sutherland Asbill & Brennan LLP

(57) ABSTRACT

According embodiments of the invention, systems and methods for sensor-level machine monitoring are provided. In one example embodiment, there is disclosed a system for monitoring a machine. The system may include a first sensor including a first processor and a second sensor including a second processor. The system may further include a communication trunk in communication with the first sensor and the second sensor, and operable to communicate sensor data between each of the first processor and the second processor. The first sensor and the second sensor are operable to generate sensor data associated with at least one machine condition. Further, at least one of the first processor or the second processor is operable to analyze sensor data generated by each of the first sensor and the second sensor and determine at least one machine fault based at least in part on the sensor data.

20 Claims, 4 Drawing Sheets

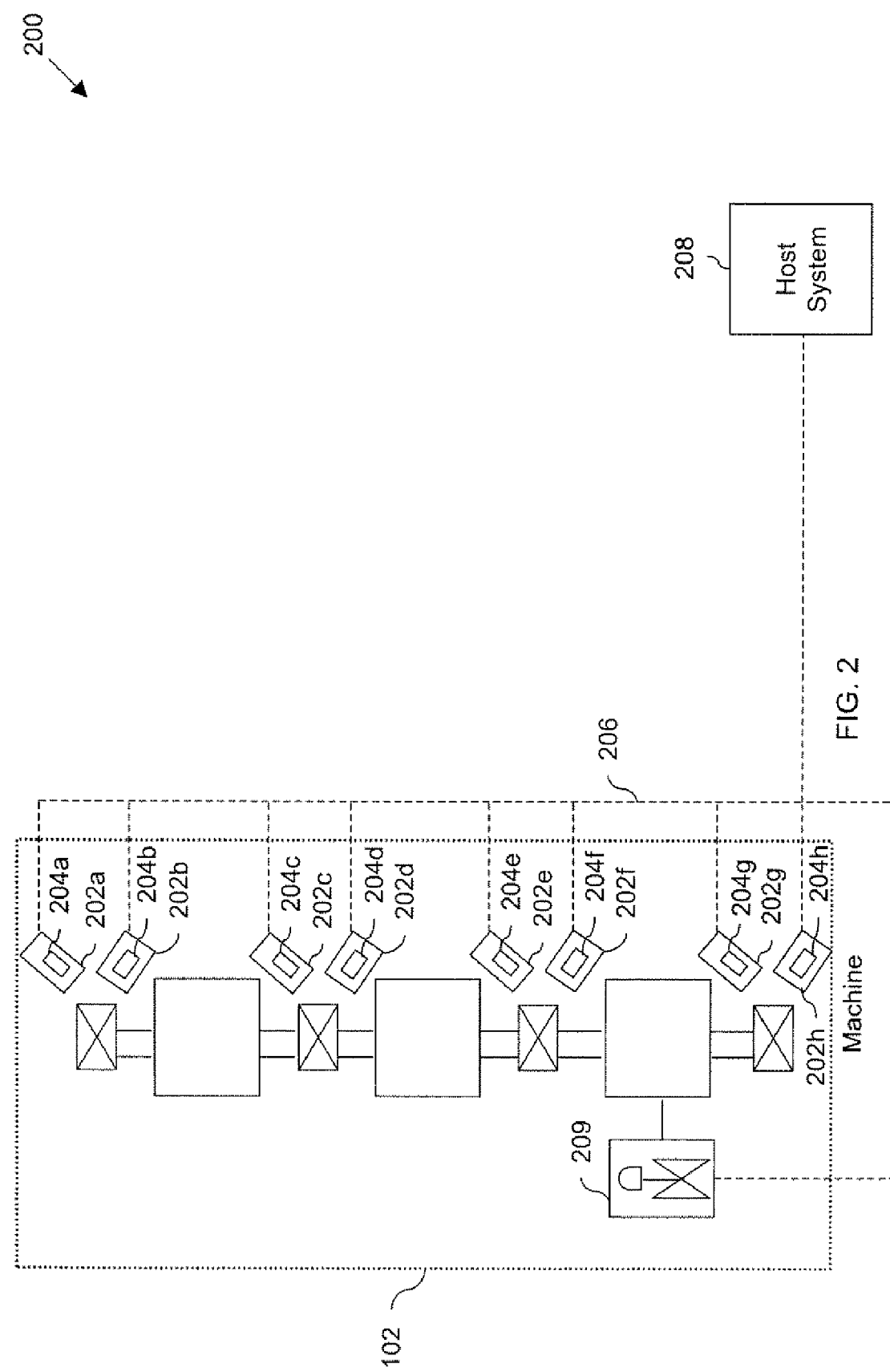

SYSTEMS AND METHODS FOR SENSOR-LEVEL MACHINE MONITORING

FIELD OF THE INVENTION

The invention relates to machine monitoring, and more specifically to systems and methods for sensor-level machine monitoring.

BACKGROUND OF THE INVENTION

High-speed, multi-bearing machines, such as those used in oil refineries, oil extraction platforms, power generation stations, and the like, may include rotating elements like rotors, shafts, and bearings. Generally, these rotating elements rotate at high speeds and may cause vibrations in the machine. There is a defined threshold level to which the variations in vibrations are acceptable. However, if the vibrations increase beyond the threshold level, the machine may be susceptible to various faults, such as machine imbalance, machine misalignment, machine bearing failure, machine bearing instability, machine thrust bearing failure, machine rub, shaft imbalance, shaft crack, machine mounting anomaly, or fluid induced instability. These various faults may cause temporary or permanent damage to the machine. Thus, to prevent occurring of these faults, the various physical quantities related to the machine, such as vibrations may be monitored in real time or near-real time, to identify the occurrence of a fault and/or to determine a fault type. Various techniques have been proposed to monitor the machine in real time or near-real time to determine the occurrence and/or identify which faults may be occurring in the machine.

A conventional technique for real time or near-real time monitoring of a machine and to identify and/or determine faults is provided by a system which includes multiple sensors, a monitoring rack, and a personal computer ("PC"). The multiple sensors are placed in the vicinity of the high speed rotating elements of the machine. These sensors sense the various physical quantities, such as vibrations, occurring in the high speed rotating elements. These sensors generate the sensed data based on the measurements of various such physical quantities and send the sensed data to the monitoring rack, which aggregates and conditions the sensed data. The monitor rack further generates alarms to protect the machine from damage. The monitor rack then sends the aggregated data to the PC for determination of the faults in the machine using software-based analysis.

However, the above-described conventional system requires a large amount of hardware to monitor the machine in real time or near-real time. Moreover, high costs are generally involved in installing, calibrating, operating, and maintaining the monitor rack, the PC, and the analysis software. Thus, it is desirable to minimize the hardware requirements and the associated cost of determining the fault in the machine.

Accordingly, there is a need for a system that provides monitoring of the machine and determination of faults with minimized hardware requirements. There is a further need for systems and methods for sensor-level machine monitoring.

BRIEF DESCRIPTION OF THE INVENTION

According to one embodiment of the invention, there is disclosed a system for monitoring a machine. The system may include a first sensor including a first processor and a second sensor including a second processor. The system may further include a communication trunk in communication with the first sensor and the second sensor, and operable to communicate sensor data between each of the first processor and the second processor. The first sensor and the second sensor are operable to generate sensor data associated with at least one machine condition. Further, at least one of the first processor or the second processor is operable to analyze sensor data generated by each of the first sensor and the second sensor and determine at least one machine fault based at least in part on the sensor data.

According to another embodiment of the invention, there is disclosed a method for monitoring a machine. The method may include providing a plurality of sensors, each including a processor having instructions. The method may further include providing at least one communication trunk in communication with the plurality of sensors, and operable to communicate sensor data between each of the plurality of sensors. Further, the method may include sensing, by each of the plurality of sensors, at least one machine condition and generating, by each of the plurality of sensors, sensor data associated with the at least one machine condition. The method may further include executing the instructions in at least one processor of the plurality of sensors to analyze the sensor data generated by each of the plurality of sensors and determine at least one machine fault based at least in part on the at least one sensor data.

According to another embodiment of the invention, there is disclosed a system for monitoring a machine. The system may include a plurality of sensors, each comprising a processor. The system may further include at least one communication trunk in communication with the plurality of sensors operable to communicate sensor data between each of the plurality of processors. Further, each of the plurality of sensors is operable to detect at least one machine condition. Further, the system may include at least one sensor of the plurality of sensors which is operable to receive an indication associated with detection of the at least one machine condition from at least one other of the plurality of sensors. Further, the processor of the at least one sensor is operable to aggregate any of the received indications, and perform at least one of a frequency domain analysis, a time domain analysis, or a filtered frequency analysis on the aggregated indications, and characterize the at least one machine condition based at least in part on the aggregated indications, and determine at least one machine fault based at least in part on the aggregated indications.

Other embodiments, aspects, and features of the invention will become apparent to those skilled in the art from the following detailed description, the accompanying drawings, and the appended claims.

BRIEF DESCRIPTION OF THE DRAWINGS

Figure 1:
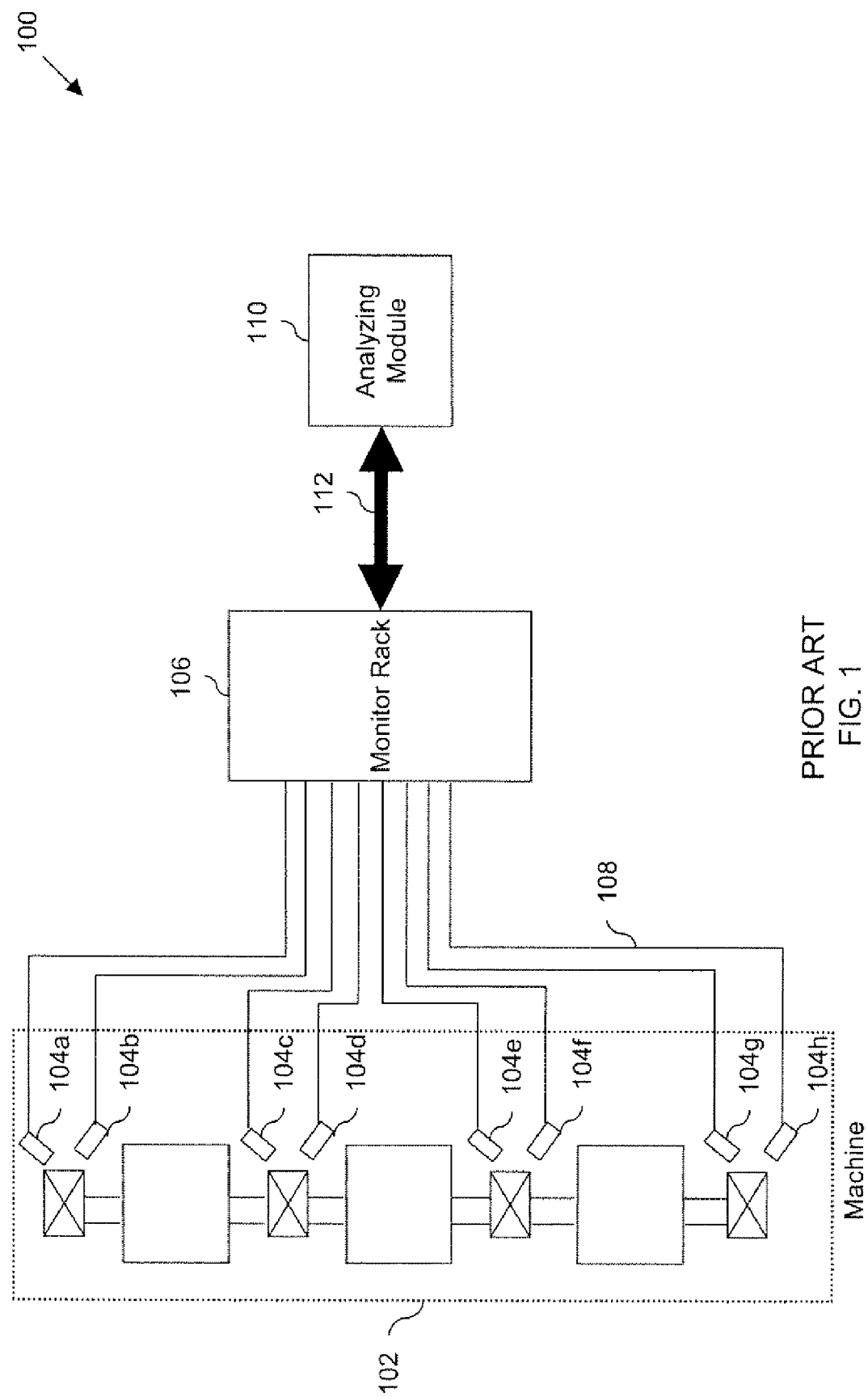

Having thus described the invention in general terms, reference will now be made to the accompanying drawings, which are not necessarily drawn to scale, and wherein:

FIG. 1 is a schematic representation of an example prior art system for monitoring a machine.

FIG. 2 is a schematic representation of an example system for monitoring the machine, in accordance with one embodiment of the invention.

Figure 3A:
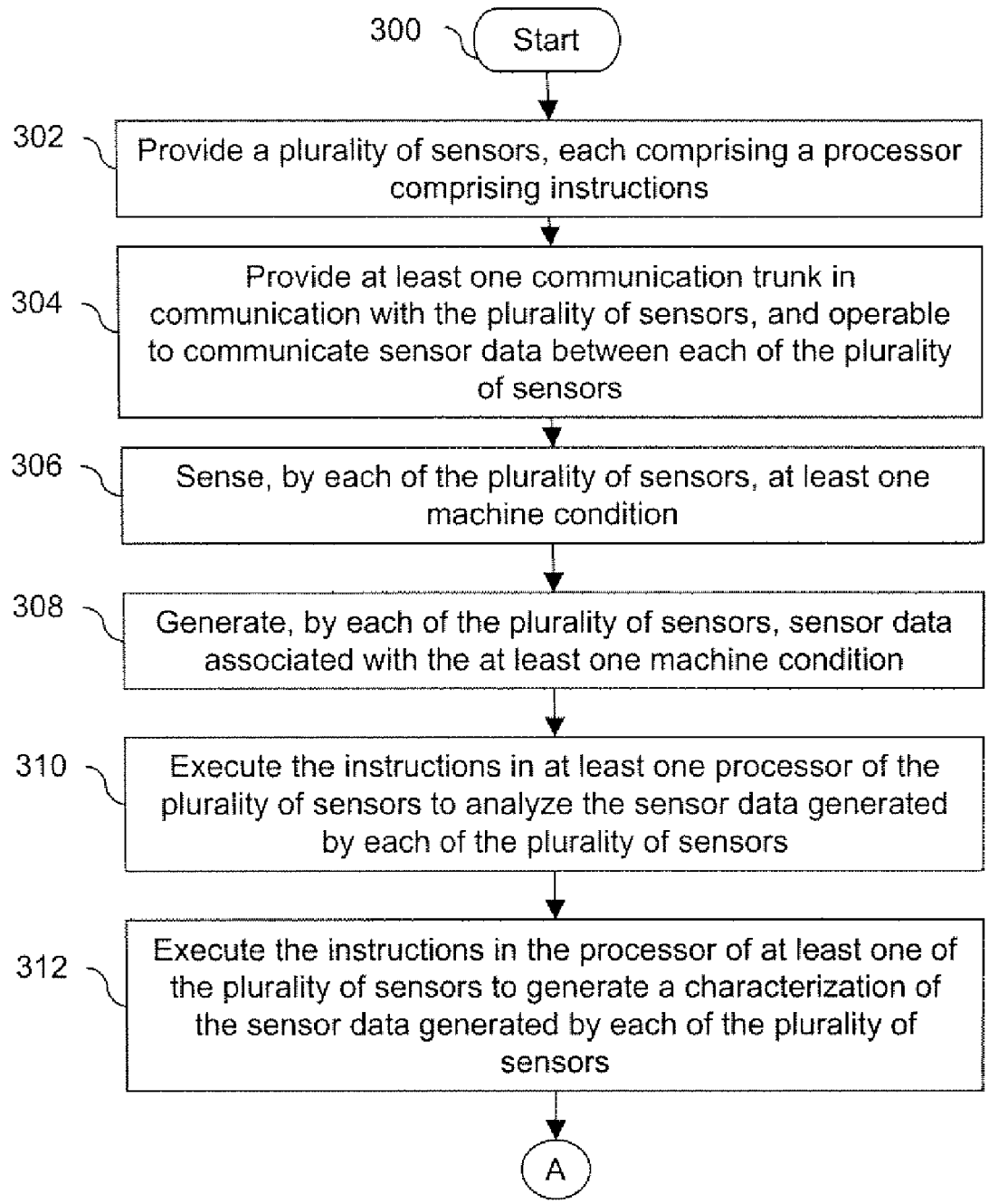
Figure 3B:
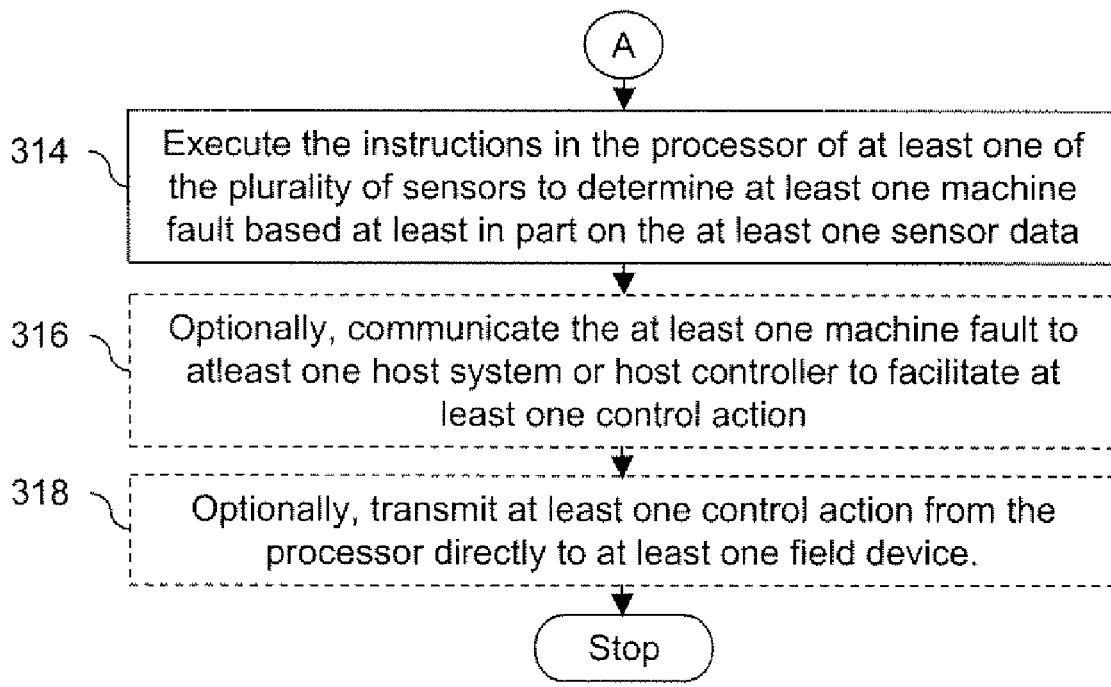

FIG. 3 is a flowchart illustrating one example method for monitoring the machine, in accordance with one embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Disclosed are methods and systems for monitoring a machine and consequently determining faults occurring in the machine. According to an embodiment of the invention, multiple sensors are placed in the vicinity of the different rotating elements of the machine. Each sensor includes a processor for measuring vibrations occurring in rotating elements of the machine. The sensors further generate sensor data that corresponds to at least one of the machine conditions. The generated sensor data from some or all of the sensors may be aggregated on at least one of the sensors. Subsequently, the processor associated with the sensor (on which the sensor data is aggregated) analyzes the sensor data, including the aggregated data also acquired, and consequently determines the faults occurring in the machine. The sensor may further communicate the determined fault to a host of the machine for remedial purposes.

FIG. 1 is a schematic representation of a prior art system 100 for monitoring a machine 102. In the prior art system 100 of FIG. 1, the machine 102 is a multi bearing machine train, which may include high speed rotating elements such as rotors, shafts, and bearings. The machine 102 may be an electrical or non-electrical rotating machine. The machine 102 may be utilized for various applications in oil refineries, oil extraction platforms, and power generation stations, for example. Being equipped with high speed rotating elements, the machine 102 is prone to various faults, such as, but not limited to, machine imbalance, machine misalignment, machine bearing failure, machine bearing instability, machine thrust bearing failure, machine rub, shaft imbalance, shaft crack, machine mounting anomaly, fluid induced instability, and specific electrical machine faults, such as air gap excursions, shorted rotor bars, loose rotor bars, axial float/magnetic-center excursions, or phasing anomalies. One or more of such faults may occur due to an increase in vibrations of the high speed rotating elements above a threshold level. The threshold level may be a defined vibration level below which the vibrations in the machine 102 are tolerable and may not cause any fault. Thus, to measure such faults in the machine 102, sensors 104a-h are placed in the vicinity of the high speed rotating elements. The sensors 104a-h are devices that measure a physical quantity, such as vibrations, and convert the measurement into an electrical signal that may be used for various types of analyses. A number of sensors such as sensors 104a-h may be used for measuring various physical quantities. The different types of sensors that may be used are a vibration sensor, a temperature sensor, a pressure sensor, a position sensor, an accelerometer, a flow sensor, a level sensor, a density sensor, a material composition sensor, or an electrical power characterization sensor, for example. Electrical power characterization sensors may measure motor or generator phase current, phase voltage, and the like. The number of sensors used in such application is not restrained and any number of sensors may be used to measure the various physical quantities. In the prior art system 100 of FIG. 1, sensors are used in pairs to measure the variations in the vibrations occurring in the machine 102 due to high speed rotating elements.

As shown in the prior art system 100, the sensors 104a-h send the sensed signal to a monitor rack 106 via a transmission medium 108. The transmission medium 108 between the sensors 104a-h and monitor rack 106 may be a wired connection. The monitor rack 106 is hardware module that monitors the output of the sensors 104a-h. The output of the sensors 104a-h is the sensed signals. The sensed signal is in the form of electrical signals of varying amplitude and frequencies. The monitor rack 106 further aggregates the sensed signals received from each of the sensors 104a-h. The monitor rack 106 process the sensed signals from all the sensors and subsequently measures the amount of vibrations in the high speed rotating elements of the machine 102. The monitor rack 106, on the basis of the measured vibration, is operable to generate an alarm if the variation in vibrations of the high speed rotating elements is beyond a predefined threshold limit. The monitor rack 106 may send the alarm to either the machine 102 operators (not shown in FIG. 1) to switch off or otherwise alter the operation of the machine 102. The monitor rack 106 may send signals to a control system (not shown in FIG. 1) to switch off or otherwise alter the operation of the machine 102. Also, the monitor rack 106 may condition the signal (sensed data signal) so that the signal may be analyzed to monitor the machine's 102 health and thus the machine's 102 fault can be determined. After adjustments to the machine 102 are made, the monitor rack 106 may send the sensed signal derived from the sensors 104a-h to an analyzing module 110 over a communication link 112 to analyze the fault in the machine 102.

The analyzing module 110 of the system 100 further analyzes the sensed data derived from the sensors 104 to determine the fault in the machine 102 by executing different types of algorithms.

As shown by the system 100 of the FIG. 1, a large amount of hardware is required to monitor the vibrations at the monitor rack 106 using the sensed data and to subsequently determine a fault by the analyzing module 110. Moreover, high costs are generally involved in installing, calibrating, operating, and maintaining the monitor rack 106, the analyzing module 110, and the software to analyze the sensed data. Thus, the hardware requirements and the cost of determining fault in the machine 102 can be reduced considerably, if the capabilities of the monitor rack 106 and the analyzing module 110 can be achieved at the level of sensors 104a-h.

FIG. 2 is a schematic representation of a system 200 for monitoring the machine 102, in accordance with one embodiment of the invention. In one example embodiment of the invention, a pair of a first sensor 202a and a second sensor 202b is placed in vicinity of the high speed rotating elements of the machine 102. Similarly, in one example embodiment, a number of other pairs of sensors 202c-d, 202e-f, and 202g-h may also placed in the vicinity of the same or different high speed rotating elements of the machine 102. The sensors 202a-h include processors 204a-h having associated memory respectively integrated therewith. For simplicity, when referring to "first sensor," "second," or "sensors," any or all of possible sensors included in embodiments of the invention may be referred to. In example embodiments, the sensors 202a-h, including processors 204a-h, may be smart digital sensors. A smart digital sensor may have numerous capabilities. For example, a smart digital sensor may be capable of storing its own information, simplifies installation, set-up, and calibration of traditionally complex machine sensing techniques, essentially allowing them to operate as "plug and play" sensors. Further, smart digital sensors may be able to embed and execute algorithms or instructions within themselves. In another example, a smart digital sensor may have field device descriptor capabilities, whereby the sensors store and are operable to communicate data containing information about the sensor and its properties. Smart digital sensors may also communicate the health and/or integrity of the machine and/or devices connected to or associated with the machine. Further, smart digital sensors may be capable of supporting various types of field devices 209 connected to the machine 102, for example by monitoring and/or communicating commands. Moreover, a smart digital sensor is capable of accepting data from other sensors, for example other smart digital sensors, and process that acquired data within itself. For example, the first sensor 202a may acquire data from the second sensor 202b and subsequently analyze the data. In another embodiment, the first sensor pair 202a-b may acquire data from one or more of the other sensor pairs 202c-d, 202e-f, and/or 202g-h. In yet another embodiment, one or more of the sensors may communicate local control instructions directly to the field devices 209 connected to the machine 102, for example actuators, valves, or other mechanical, electromechanical, or electronic control mechanisms operable to alter the operation of the machine. In one example embodiment, the first sensor 202a may include a Programmable Logic Device ("PLD"). Examples of programmable logic devices may be a Field Programmable Gate Array ("FPGA"), an Application-Specific Integrated Circuit ("ASIC"), a microprocessor, a Digital Signal Processor ("DSP"), or a Complex Programmable Logic Device ("CPLD"). An FPGA is a type of logic chip that can be programmed to perform different tasks and an ASIC is a chip designed for a particular application. A microprocessor may incorporate all of the functions of a Central Processing Unit ("CPU") on a single Integrated Circuit ("IC"). A DSP may be a specialized microprocessor designed specifically for digital signal processing. A CPLD contains multiple PLD blocks whose inputs and outputs are connected together.

Referring again to FIG. 2, the first sensor 202a and the second sensor 202b are operable to generate sensor data based on various machine 102 conditions. This sensed data may be an indication of the machine 102 condition. Hereinafter, the "sensed data" may be interchangeably referred to as an "indication of the machine condition." The machine 102 conditions may be based on various physical behavior of the machine 102 such as, but not limited to, vibrations, temperature, pressure, position, acceleration, flow, density, levels, and material compositions. In one example embodiment, the sensors 202a-h may sense the vibrations of the high speed rotating elements of the machine 102. However, it is appreciated that various sensors can be used to sense different machine behavior. The different kinds of sensors that may be used are, but not limited to, vibration sensors, temperature sensors, pressure sensors, position sensors, accelerometers, flow sensors, level sensors, density sensors, or material composition sensors.

In one embodiment of the invention, sensors 202a-h sense machine conditions from the high speed rotating elements of the machine 102 and/or sense electrical power characteristics, such as phase current or phase voltage. For example, to sense variations in the vibration of the high speed rotating elements of the machine 102, the first sensor 202a and the second sensor 202b may be positioned orthogonal (90 degrees) to each other in a plane perpendicular to a centerline of the machine 102. In another example embodiment of the invention, however, the first sensor 202a and the second sensor 202b may be positioned in a plane perpendicular to the centerline of the machine 102 at angles other than the 90 degrees. Known calibration techniques may be applied to account for various sensor positions with respect to the machine.

Further, the sensors 202a-h are coupled to each other via a communication trunk 206. In one example embodiment, the communication trunk 206 may be a digital, bi-directional, multi-drop, serial-bus communication network used to link isolated field devices, such as controllers, transducers, actuators, and sensors. The bi-directional capability of the communication trunk 206 supports communication of the sensed data among the sensors 202a-h at the same time. Further, the communication trunk 206 provides a high-speed and time-critical transmission of the sensed data.

In one example embodiment, the communication trunk 206 may be based on "FOUNDATION Fieldbus" standard. The "FOUNDATION Fieldbus" standard provides for a digital, serial, two-way communications system that may serve as a base-level network in a plant or factory automation environment, for example. In another example embodiment of the invention, the communication trunk 206 may be based on the Process Field Bus ("PROFIBUS") standard. The "PROFIBUS" is a standard for field bus communication in automation technology. Variants of the "PROFIBUS" standard may be used to operate sensors and actuators via a centralized controller in production technology and to monitor measuring equipment via a process control system in process engineering. Further, both the "FOUNDATION Fieldbus" and the "PROFIBUS" standards are based on an Open System Interconnection ("OSI") network communication model. The "OSI" model is a logical framework for standards for the network communication. The "OSI" model is an abstract description for layered communications and computer network protocol design. The "OSI" model, as generally described, may divide network architecture into multiple layers, for example seven layers which, from top to bottom, may be the Application, Presentation, Session, Transport, Network, Data-Link, and Physical Layers. Implementation of these or similar standards and similar automation communication techniques, such as DeviceNet or any other smart digital architecture, used in conjunction with the sensors 202a-h provide the ability to sense, process, analyze, and/or communicate data on and between the sensors, as described herein.

Further, in one example embodiment, when the sensors 202a-h have generated the sensed data, at least one, e.g., the first sensor 202a or the first and the second sensors 202a-b, among the sensors 202a-h may aggregate data from one or more of the other sensors 202b-h. The first sensor 202a may receive the data over the communication trunk 206.

In one example embodiment, if the first sensor 202a senses the variation in vibrations above a threshold level from any of the aggregated sensed data, then the first processor 204a will communicate this variation to a host system 208 over the communication trunk 206. In an example embodiment, the host system 208 may be a management or an advisory system that provides advisory information about the machine 102's health and faults to an operator of the machine 102. For example, the host system 108 may display or otherwise transmit information to an operator of the system, to another management or advisory system, record conditions in machine logs for subsequent analysis and reporting, and the like. In another example embodiment, the host system 208 may be a host controller operable to alter the operating behavior of the machine 102, such as to prevent the machine 102 from incurring or otherwise minimizing the occurrences of any kind of damages due to variations in the vibration above the threshold level. A host controller may perform different control actions to prevent the machine 102 from incurring or otherwise minimizing the occurrences of any kind of damages or faults. The different control actions may include, but not limited to, adjusting control of the machine 102, generating an audio or visual alarm or alert or notification, transmitting or communicating the sensed data or other control signals to an ancillary machine, or any other control system. Further, adjusting controls of the machine 102 may include, but not limited to, commands to stop or trip the machine 102, commands to reduce load of the machine 102, commands to reduce the speed of the machine, and commands to send communication to the ancillary machine or any other control system. As used herein, the terms "host system" and "host controller" may be used interchangeably In another example embodiment, the first processor 204a may communicate a control action directly to a field device 209 for controlling the machine 102 locally, for example instead of or in addition to communicating commands to a host controller or host system 208. In one example embodiment, the first sensor 202a may communicate the variation to both the host system 208 and the field device 209, however. The field device 209 may be any local control device, such as any mechanical, electrical, or electromechanical device operable to adjust or otherwise alter any aspect of machine operation. Examples field devices 209 acting as a local control device may be, but not limited to, control valve actuators, inlet guide vane actuator, air louver actuator, bypass valve actuator, fuel control actuators, fuel temperature actuators, lube oil actuators, product flow actuators, or product flow temperature controls. For example, in response to measurements sensed by the sensors 202a-h, the one or more processor 204a-h may determine one or more control actions responsive to or effecting machine parameters, such as, but not limited to, fuel flow, temperature, bearing temperature, bearing vibration, and/or product inlet/outlet temperature, for example. The field device 209 may then control the machine 102 locally.

Referring again to FIG. 2, one or more of the processors 204a-h may include a digitally configurable algorithm to analyze the sensed data. In one example embodiment, the digitally configurable algorithm may be downloaded in the memory of the processor, such as the first processor 204a. In another example embodiment, the digitally configurable algorithm may be embedded in the memory of a programmable logic device. The processors 204a-h may utilize the digitally configurable algorithm to analyze the sensed data, optionally including the aggregated data from other sensors, and thus to determine faults or other behavior occurring in the machine 102. In example embodiments, the sensed data may be analyzed by a frequency domain analysis, a time domain analysis, or a filtered frequency analysis, for example. The frequency domain analysis may be performed using a Fast Fourier Transform ("FFT"). The FFT converts a time domain representation of the signal sensed by the smart digital sensor into a frequency domain representation. The time domain analysis may include analyzing vibration waveforms, orbit shape of the rotating element, DC offset in the sensed data, position of the rotating elements, absolute phase angle, synchronous, and/or non-synchronous analysis. The filtered frequency analysis may include selecting and analyzing parts of the sensed data based on frequency filters. Using at least one of these, or any other analysis methods, on the sensed data, the first processors 204a-h may be able to determine different types of faults or other conditions occurring in the machine 102. Example fault types may be, but not limited to, machine imbalance, machine misalignment, machine bearing failure, machine bearing instability, machine thrust bearing failure, machine rub, shaft imbalance, shaft crack, machine mounting anomaly, and fluid induced instability. Further, the processors 204a-h may communicate the determined faults to the host system 208.

Further, in one embodiment of the invention, the one or more of the processors 204a-h may generate a characterization of the sensed data. The characterization of the sensed data may include, but not limited to, an orbit shape of machine, a full spectrum of machine, a filtered spectrum of machine, a rotor position, a precessional direction, phase angles, or filtered frequency vibration amplitudes. Subsequently, the processors 204a-h may communicate the sensed data characterization to the host system 208 via the communication trunk 206.

Referring again to FIG. 2, in one example embodiment, the second sensor 202b and the first sensor 202a are both smart digital sensors. Since, both the first processor 204a and the second processor 204b analyze their respective data, the system 200 may be operably implemented as a redundant and/or distributed system. In the redundant or distributed system, both the first processor 204a and the second processor 204b can sense and analyze their own data and the data collected from other sensors 202a-h over the communication trunk 206. Further, it will be apparent that there could be multiple smart digital sensors (like the first sensor 202a and the second sensor 202b) in the system 200, such as sensors 202c-h, and the multiple smart digital sensors may analyze each other's data to provide additional redundancy and/or distribution of sensing tasks.

FIG. 3 is a flowchart illustrating one example of a method 300 for monitoring the machine, according to an embodiment of the invention. Provided is a flow chart illustrating an example of monitoring health of a machine by the sensor.

The example method begins at block 302. At block 302, multiple sensors are installed in the vicinity of high speed rotating elements of the machine. Each sensor is provided with a processor that includes instructions to sense the machine conditions. It is apparent that various sensors can be used to sense various machine conditions. Example sensors that may be used are, but not limited to, a vibration sensor, a temperature sensor, a pressure sensor, a position sensor, an accelerometer, a flow sensor, a level sensor, a density sensor, a material composition sensor, or an electrical power characterization sensor, for example. Further, in one example embodiment, the sensors may be installed in pairs in the vicinity of high speed rotating elements. In one example method, a first sensor and a second sensor in the sensor pair are placed orthogonally (90 degrees) to each other in a plane perpendicular to the machine's centerline. In another example method, the first sensor and the second sensor may be positioned in a plane perpendicular to the centerline of the machine 102 at angles other than the 90 degrees.

Following block 302 is block 304, in which a communication trunk is provided. The communication trunk is in communication with sensors installed at the machine. The communication trunk is coupled to each sensor and is operable to communicate the sensed data between the sensors.

Following block 304 is block 306, in which one or more of the sensors installed on the machine senses the machine conditions. The machine conditions are based on the various physical machine behaviors and conditions, such as, but not limited to, vibrations, temperature, pressure, position, acceleration, flow, density, levels, material compositions of machine throughput, and/or electrical power characteristics, such as phase current or phase voltage, of the machine.

Following block 306 is block 308, in which each sensor generates the sensor data associated with the machine condition. Each sensor senses the variations in the physical machine behaviors and conditions associated with the machine and corresponding to that variation generates electrical signal which forms the sensed data.

Following block 308 is block 310, in which a first processor in one of the sensor executes a set of instructions to analyze the sensed data generated by each of the sensors installed at the machine. The instructions may be in the form of digital configurable algorithm which may be embedded or downloaded into memory of the processor. In one example method, the processor first aggregates the sensed data from all the sensors over the communication trunk. After aggregating the data from all the sensors, the first processor analyzes the data, such as by: frequency domain analysis, time domain analysis, and/or filtered frequency component analysis, for example. The frequency domain analysis which may be performed using FFT. The FFT converts a time domain representation of the sensed data by the smart digital sensor into a frequency domain representation. Time domain analysis may include analyzing vibration waveforms, orbit shape of the rotating element, DC offset in the sensed data, position of the rotating elements, absolute phase angle, and/or synchronous and non synchronous analysis. Filtered frequency analysis may include selecting and analyzing parts of the sensed data based on frequency filters.

In one aspect of an example method embodiment, the second sensor and the first sensor are smart digital sensors. Therefore, both the first processor and a second processor included in the second sensor analyze their respective data, providing a method of analyzing machine conditions using a redundant and/or a distributed system. In this case, both the first processor and the second processor sense and analyze their own data and the data collected from the other sensors over the communication trunk. Further, it will be apparent to a person of ordinary skill in the art that there could be multiple smart digital sensors and the multiple smart digital sensors may analyze each other's data.

Following block 310 is block 312, in which the first processor executes a set of instructions to generate a characterization of the sensed data. The characterization of the sensed data may include, but is not limited to, an orbit shape of machine, a full spectrum of machine, a filtered spectrum of machine, a rotor position, a precessional direction, phase angles, and/or filtered frequency vibration amplitudes.

Following block 312 is block 314, in which the first processor executes a set of instructions to determine faults in the machine. Various faults that could be determined may be, but are not limited to, machine imbalance, machine misalignment, machine bearing failure, machine bearing instability, machine thrust bearing failure, machine rub, shaft imbalance, shaft crack, machine mounting anomaly, fluid induced instability, and specific electrical machine faults, such as air gap excursions, shorted rotor bars, loose rotor bars, axial float/ magnetic-center excursions, or phasing anomalies, for example. It is appreciated, however, that the fault types will differ depending upon the type of machine and/or the machine characteristics and behavior being sensed.

Following block 314 is block 316, in which the machine fault is optionally communicated to a host system or a host controller to facilitate the host system to take a control action. The fault is communicated to the host system over the communication trunk. In an example method, the host system is management or advisory system that provides advisory information about the machine's and faults to an operator of the machine.

Following block 316 is block 318, in which the processor optionally transmits control actions to a field device for controlling any aspect or aspect(s) of the machine operation locally. In one example, the processor may transmit one or more control actions to the field device over the communication trunk. In one embodiment, the no additional analysis is necessary at the field device level before controlling the one or more aspects of machine operation.

In another aspect of an example method embodiment, the host system is a host controller that is operable to generate a control action for controlling the operation of the machine, such as to prevent the machine from any kind of faults due to variation in the physical conditions above a threshold level. The host system or controller may generate various types of control actions such as, but not limited to, adjusting control of the machine, generating an audio or visual alarm or alert notification, or transmitting or communicating the sensed data and/or other control signals to an ancillary machine or any other control system.

Embodiments of the invention are described above with reference to block diagrams and schematic illustrations of methods and systems according to embodiments of the invention. It will be understood that each block of the diagrams and combinations of blocks in the diagrams can be implemented by program instructions or logic. These instructions may be loaded onto one or more general purpose processor, or other programmable data processing apparatus, such as a general purpose or special purpose computer, to produce machines such that the instructions which execute on the computers or other programmable data processing apparatus create means for implementing the functions specified in the block or blocks. Such instructions may also be stored in a processor-readable memory that can direct a programmable data processing apparatus to function in a particular manner, such that the instructions stored in the processor-readable memory produce an article of manufacture including instruction means that implement the function specified in the block or blocks.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for monitoring a machine, comprising:
a first sensor comprising a first processor;
a second sensor comprising a second processor; and
at least one communication trunk in communication with the first sensor and the second sensor, and operable to communicate sensor data between each of the first processor and the second processor;
wherein the first sensor and the second sensor are operable to generate or detect sensor data associated with at least one machine condition; and
wherein at least one of the first processor or the second processor is operable to:
analyze sensor data generated or detected by each of the first sensor and the second sensor;
aggregate the received sensor data;
perform at least one of frequency domain analysis, a time domain analysis, or a filtered domain analysis on the sensor data; and determine at least one machine fault based at least in part on the analyzed sensor data, wherein the at least one machine fault relates to a physical condition of the machine.

2. The system of claim 1, wherein at least one of the first processor or the second processor is further operable to generate a characterization of the sensor data generated by each of the first sensor and the second sensor.

3. The system of claim 2, wherein the characterization comprises at least one of:
a machine orbit shape, a machine full spectrum, a machine filtered spectrum, or a rotor position.

4. The system of claim 1, wherein the at least one machine fault comprises at least one of: machine imbalance, machine misalignment, machine bearing failure, machine bearing instability, machine thrust bearing failure, machine rub, shaft imbalance, shaft crack, machine mounting anomaly, fluid induced instability, air gap excursion, shorted rotor bar, loose rotor bar, axial float/magnetic-center excursion, or phasing anomaly.

5. The system of claim 1, wherein the machine comprises a rotating machine and wherein the first sensor and the second sensor comprise a pair of vibration sensors positioned in distinct planes with respect to each other.

6. The system of claim 1, wherein the first sensor and the second sensor each comprise a smart digital sensor.

7. The system of claim 1, wherein at least one of the first sensor or the second sensor comprise at least one of a vibration sensor, a temperature sensor, a pressure sensor, a position sensor, an accelerometer, a flow sensor, a level sensor, a density sensor, a material composition sensor, or an electrical power characterization sensor.

8. The system of claim 1, wherein at least one of the first processor or the second processor is further operable to perform at least one of a frequency domain analysis, a time domain analysis, or a filtered frequency analysis on the sensor data generated by each of the first sensor and the second sensor.

9. The system of claim 1, wherein at least one of the first processor or the second processor is further operable to communicate the at least one machine fault to at least one of a host system or a host controller.

10. The system of claim 9, wherein the host system or host controller is operable to facilitate at least one control action based at least in part on the at least one machine fault.

11. The system of claim 1, wherein both of the first processor and the second processor are operable to analyze the at least one machine condition and determine the at least one machine fault.

12. The system of claim 1, wherein at least one of the first processor or the second processor are operable to communicate at least one control action from the first processor or the second processor to at least one field device associated with the machine.

13. A method for monitoring a machine, comprising:
providing a plurality of sensors, each comprising a processor comprising instructions;
providing at least one communication trunk in communication with the plurality of sensors, and operable to communicate sensor data between each of the plurality of sensors;
sensing, by each of the plurality of sensors, at least one machine condition;
generating, by each of the plurality of sensors, sensor data associated with the at least one machine condition; and
executing the instructions in at least one processor of the plurality of sensors to:
analyze the sensor data generated by each of the plurality of sensors;
perform at least one of frequency domain analysis, a time domain analysis, or a filtered domain analysis on the sensor data and
determine at least one machine fault based at least in part on the analyzed sensor data, wherein the at least one machine fault relates to a physical condition of the machine.

14. The method of claim 13, further comprising executing the instructions in at least one processor of the plurality of sensors to generate a characterization of the sensor data generated by each of the plurality of sensors.

15. The method of claim 14, wherein the characterization comprises at least one of: a machine orbit shape, a machine full spectrum, a machine filtered spectrum, or a rotor position.

16. The method of claim 13, wherein executing the instructions to determine the at least one machine fault further comprises determining at least one of: machine imbalance, machine misalignment, machine bearing failure, machine bearing instability, machine thrust bearing failure, machine rub, shaft imbalance, shaft crack, machine mounting anomaly, fluid induced instability, air gap excursion, shorted rotor bar, loose rotor bar, axial float/magnetic-center excursion, or phasing anomaly.

17. The method of claim 13, wherein executing the instructions to analyze the at least one machine condition further comprises performing at least one of a frequency domain analysis, a time domain analysis, or a filtered frequency analysis on the sensor data generated by each of the plurality of sensors.

18. The method of claim 13, further comprising:
communicating the at least one machine fault to at least one of a host system or a host controller; and
generating, by the host system or host controller, at least one control action based at least in part on the at least one machine fault.

19. The method of claim 13, further comprising:
generating by at least one of the first processor or the second processor at least one control action responsive to determining the at least one machine fault; and
communicating the at least one control action from the first processor or the second processor to at least one field device associated with the machine.

20. A system for monitoring a machine, comprising:
a plurality of sensors, each comprising a processor;
at least one communication trunk in communication with the plurality of sensors operable to communicate sensor data between each of the plurality of processors;
wherein each of the plurality of sensors is operable to detect at least one machine condition;
wherein at least one sensor of the plurality of sensors is operable to receive an indication associated with detection of the at least one machine condition from at least one other of the plurality of sensors;
wherein the processor of the at least one sensor is operable to:
aggregate any of the received indications;
perform at least one of a frequency domain analysis, a time domain analysis, or a filtered frequency analysis on the aggregated indications;
characterize the at least one machine condition based at least in part on the aggregated indications; and
determine at least one machine fault based at least in part on the aggregated indications.

* * * * *